United States Patent [19]

Greco et al.

[11] Patent Number: 5,114,675
[45] Date of Patent: May 19, 1992

[54] HF ALKYLATION UNIT WITH ADDITIVE DISPENSER

[75] Inventors: Saverio G. Greco, Princeton Junction; Costandi A. Audeh, Princeton, both of N.J.

[73] Assignee: Mobil Oil Corporation, Fairfax, Va.

[21] Appl. No.: 489,986

[22] Filed: Mar. 7, 1990

Related U.S. Application Data

[63] Continuation-in-part of Ser. No. 229,669, Aug. 8, 1988, Pat. No. 4,938,935.

[51] Int. Cl.$^5$ ............................................. G05B 9/05
[52] U.S. Cl. ................................... 422/62; 422/111; 422/117; 585/701; 585/723
[58] Field of Search ............ 422/62, 83, 111, 117, 422/119, 234, 235; 585/701, 709, 712, 717, 719, 723

[56] References Cited

U.S. PATENT DOCUMENTS

| | | | |
|---|---|---|---|
| 2,398,905 | 4/1946 | Linn | 585/725 |
| 2,537,076 | 1/1951 | McCauley et al. | 423/240 R |
| 3,016,285 | 1/1962 | Clifford | 423/240 R |
| 3,211,536 | 10/1965 | Van Pool | 585/701 |
| 3,223,749 | 12/1965 | Van Pool et al. | 585/701 |
| 3,709,978 | 1/1973 | Predikant | 423/481 X |
| 3,728,527 | 4/1973 | Hopkins et al. | 585/701 |
| 3,778,603 | 12/1973 | Sweeney, Jr. | 585/701 |
| 3,925,502 | 12/1975 | Boney et al. | 585/922 X |
| 3,969,482 | 7/1976 | Teller | 423/240 R X |
| 4,205,196 | 5/1980 | Makovec et al. | 585/701 |
| 4,276,257 | 6/1981 | Dixon et al. | 585/701 |
| 4,482,969 | 11/1984 | Funk et al. | 423/240 R |
| 4,629,610 | 12/1986 | Friese et al. | 423/240 R |
| 4,677,244 | 6/1987 | Hachmuth et al. | 585/701 |
| 4,713,774 | 12/1987 | Funk et al. | 422/62 X |
| 4,938,936 | 7/1990 | Yan | 423/240 R |
| 4,985,220 | 1/1991 | Audeh et al. | 585/723 X |

*Primary Examiner*—David L. Lacey
*Assistant Examiner*—Jeffrey R. Snay
*Attorney, Agent, or Firm*—Alexander J. McKillop; Charles J. Speciale; Malcolm D. Keen

[57] ABSTRACT

An HF alkylation unit incorporates a source of a proton acceptor additive which may be added to the HF alkylation acid in the event of a release of acid from the unit. The addition of the proton acceptor to the acid alters the character of HF droplets in an HF cloud to make them more easily treated by a simple water drench. The proton acceptor is maintained in a pressurized container in the unit and is connected to the reaction section of the unit by way of additive release valves under the control of an emergency controller which opens the valves and permits the additive to enter the reaction section of the unit and mix with the acid to modify its characteristics. The container may be connected to the major acid-containing process vessels in the unit, specifically the acid settler and the acid cooler (in a gravity flow unit) or the acid settler and the reactor (in a pump-around unit).

7 Claims, 3 Drawing Sheets

HF ALKYLATION UNIT WITH ADDITIVE DISPENSER

CROSS-REFERENCE TO RELATED APPLICATIONS

This application is a continuation-in-part of co-pending application Ser. No. 07/229,669, filed 8 Aug. 1988 now U.S. Pat. No. 4,938,935, and is filed as a result of a restriction requirement under 35 USC 121 made in that application. The disclosure of Ser. No. 07/229,669 is incorporated into this application by reference.

FIELD OF THE INVENTION

This invention relates to the control and neutralization of a hydrogen fluoride vapor cloud by altering the nature of the hydrogen fluoride droplets contained in the cloud.

BACKGROUND OF THE INVENTION

Hydrogen fluoride, or hydrofluoric acid (HF) is used as a catalyst in isomerization, condensation, polymerization and hydrolysis reactions. The petroleum industry uses anhydrous hydrogen fluoride primarily as a liquid catalyst for alkylation of olefinic hydrocarbons to produce alkylate for increasing the octane number of gasoline and the HF alkylation process is responsible for producing a significant proportion of high octane gasoline components in the United States at the present time. In 1984, for example, the total U.S. HF alkylation capacity was 69,160 m$^3$ (435,000 barrels) per day, using about 0.43 to 1.0 kg of HF per cubic meter of alkylate.

In spite of the corrosive and toxic nature of hydrogen fluoride, the superior design, construction and operational precautions accumulated over years of experience in its manufacture and use have shown that HF can be handled safely, provided that its hazards are recognized and appropriate precautions taken. Although many safety precautions are taken there remains a concern for the potential danger of leaks.

An HF-alkylation acid composition is composed of about 88% HF, 6.5% acid soluble oils, 4% C3/C4 alkylate and 1.5% water. Generally, an alkylating plant is able to cope with minor spills of HF-alkylation acid caused by mechanical failures or corrosion, but in the unlikely event of a massive leak or spill of HF-alkylation acid, from an alkylating unit, an aerosol cloud will form instantaneously. It is estimated that the cloud will be made up of 70 to 88% of HF aerosol droplets having a size in the range of 0.5 to 5.0µ and a surface tension of 8.62 dynes/cm at 1.82° C. These droplets are very small compared to the droplets of water in a normal water drench and therefore a simple water drench is not generally capable of removing the entire HF spill.

Variables that control the size of droplets in a cloud include the charge on the particles, the surface tension of the liquid from which the particles are made an the influence of various solutes present in the HF-alkylation acid mixture. Thus, the alkylation acid on escape will develop a cloud characteristic of its composition, the charge of the HF droplets and the surface tension of the droplets at the time of the leak.

A number of alternative methods to the simple water drench have been proposed. U.S. Pat. No. 4,210,460, for example, describes a method for treating an HF liquid spill by applying a quantity of an aqueous solution of calcium acetate to the spill in an amount equal to at least seven times the estimated volume of the spill, after which the spill is treated with powdered magnesium oxide and a pH indicator such as bromothymol blue. After the mixture reaches a persistent blue color, indicating a safe state, the spill is cleaned up mechanically.

At the 1982 Hazardous Material Spills Conference, Edward C. Normal of National Foam System Inc. reported the application of CHF-784 foam (a proprietary composition) to the contents of a damaged tank emitting an HF cloud after treatment with limestone. An immediate reduction in fume evolution was apparent after the foam application.

Gordon K. Braley, at the proceeding of the 1980 National Conference on Control of Hazardous Material Spills, in Louisville, Ky. on 15 May 1980 reported the treatment of relatively small amounts of controlled liquid spills of anhydrous hydrogen fluoride with high molecular weight polymers including polyacrylamide, polymethylmethacrylate, and polyvinyl alcohol. These materials applied in the form of a bead polymer formed a "skin" over the spill preventing fuming of the liquid. Polyacrylamide was deemed the most effective skin-forming agent.

Of the art cited above, only Edward C. Normal discusses an alleged successful treatment of a cloud containing HF. However, the composition used to treat such a cloud was not publicly disclosed.

In our co-pending application Ser. No. 07/229,669 we have disclosed a practical technique for altering or modifying the properties of the HF vapor cloud in order to make it more susceptible to knock-down by a water drench. According to the technique described in Ser. No. 07/229,669, a proton acceptor which has multiple sites available for protonation is brought into contact with the HF acid to form multiply charged, highly polar species which modify the nature of the acid cloud and render it amenable to being treated with a water drench. The additive i.e. the proton acceptor, may be added to the alkylation acid as a permanent component of the inventory of acid or, alternatively, it may be added to the alkylation acid when necessary in the event of a release of acid from the unit. Reference is made to Ser. No. 07/229,669 for a more detailed disclosure of the technique together with examples of suitable proton acceptors.

SUMMARY OF THE INVENTION

The present invention relates to the incorporation of a chemical additive, i.e., a proton acceptor to an HF-alkylation acid composition. The proton acceptor alters the charge on HF droplets and the surface tension of HF droplets, making them more easily treated by a simple water drench. In this way, the characteristics of the HF droplets during an HF-alkylation acid spill are changed so as to eliminate the formation of an aerosol upon its release into the atmosphere. The present invention relates to an alkylation unit which incorporates features which enable the additive to be injected into the acid whenever needed to change the characteristics of the acid so that upon release into the atmosphere the physical properties of the acid have been altered, thus reducing the hazard presented by the released acid, as discussed above.

An HF alkylation unit according to the present invention incorporates a source of the proton acceptor additive which may be added to the HF alkylation acid in the event of a release of acid from the unit, to modify the character of the released acid. The proton acceptor additive is maintained in a pressurised container in the unit and is connected to the reaction section of the unit by means of additive release valves under the control of an emergency controller which opens the valves and permits the additive to enter the reaction section of the unit and mix with the acid to modify its characteristics. The container may be connected to the major acid-containing process vessels in the unit, specifically the acid settler and the acid cooler (in a gravity flow unit) or the acid settler and the reactor (in a pump-around unit) in order to bring the additive into contact with the bulk of the acid in the unit in the shortest possible time, so as to modify its properties as quickly as possible.

THE DRAWINGS

FIG. 1 is a simplified schematic illustration of an apparatus for injecting the additive into the alkylation acid upon detection of a leak from the unit, FIG. 2 is a simplified illustration of a gravity flow alkylation unit equipped with an additive injector, and FIG. 3 is a simplified illustration of a pumped circulation alkylation unit equipped with an additive injector.

DETAILED DESCRIPTION

Figure 1:
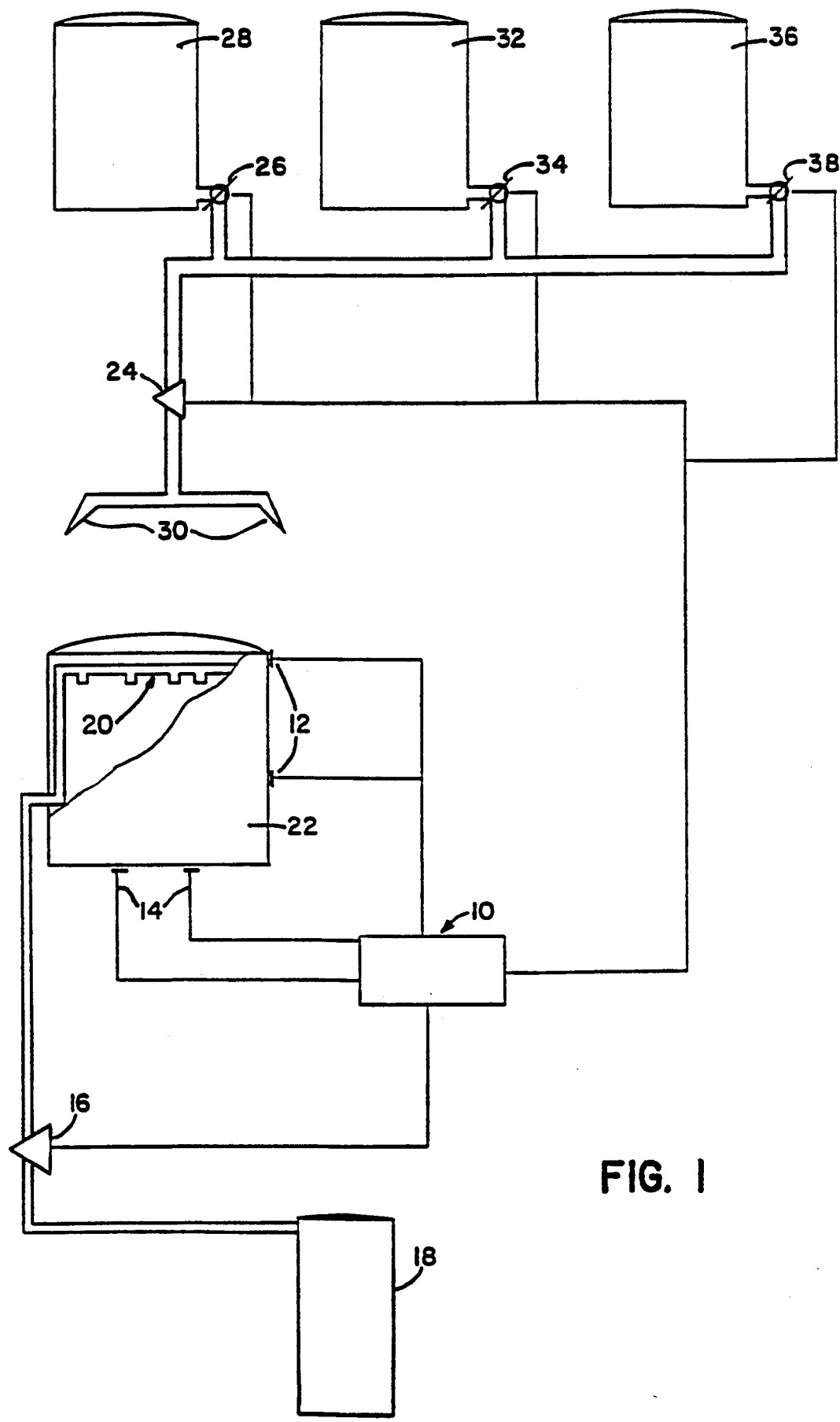

Two types of HF alkylation unit are in general use at the present time. In one type, the gravity flow type reactor, the hydrocarbon reactants meet the liquid hydrofluoric acid entering the bottom of the reactor from an acid cooler to which the acid flow from an acid settler after the alkylation reaction has taken place. The driving force for the circulation of the acid and the hydrocarbon reactants is the difference in density between the catalyst and the hydrocarbons at different points in the system plus the jetting action of the HF injection nozzles. The acid settler permits a phase separation to take place between the denser acid phase and the lighter hydrocarbon phase and the acid phase is recycled to the acid cooler and then back to the reactor; the hydrocarbon phase including the alkylation product is fed to a fractionation section where the propane and unreacted isobutane are separated from the motor fuel alkylate fraction. The isobutane is recycled and propane is removed from the unit. A unit of this type is described in U.S. Pat. No. 3,716,343, to which reference is made for a description of the unit and its mode of operation.

The other principal type of unit currently in use is the pumped flow type in which the mixed hydrocarbon feed is introduced into the reactor through spargers along the vertical length of the reactor. From the reactor the catalyst and the hydrocarbons flow into an acid settler where a phase separation takes place in the same way as in the gravity flow unit, permitting product and catalyst recovery in the same manner as described above. Compared to the gravity flow reactor, the pumped circulation reactor uses a smaller inventory of acid because of the higher circulation speed of the catalyst in this type of unit.

The present additive dosing system is intended for use with either type of alkylation unit i.e. either with a gravity flow unit or a pumped circulation unit. It may also be used in conjunction with a low acid inventory unit equipped with an acid evacuation system of the type described in our co-pending patent application Ser. No. 07/489,648, filed concurrently, entitled HF Alkylation Unit, to which reference is made for a description of such a unit together with a description of gravity flow and pump-around units. The gravity flow and pumped circulation units may be provided with acid evacuation systems of the type described in Ser. No. 07/489,648.

The present additive injection or dosing system is used in an alkylation unit which relies upon the detection of any massive leak or other uncontrolled release from the unit, i.e. a leak which can escape as a toxic cloud beyond the confines of the alkylation unit as distinct from a small leak which can be easily contained by water mitigation. To ensure early detection of any massive leak, HF detectors should be placed about the top periphery of the storage tank or other item of process equipment containing HF-alkylation acid and preferably also about a mid-portion of such a tank or item of equipment. The detectors should also be located at weld seams, pipe connections and other conduits used for transporting HF-alkylation acid to the alkylation reactor, as well as any other places where a leak might occur. Suitable HF detectors include optical instruments such as TV cameras, chemical analysers and the like. HF detectors are disclosed in U.S. Pat. No. 4,552,624, to which reference is made for a disclosure of such detectors, may be used.

Although HF detectors can monitor an initial HF leak and transmit such information to a computer which then activates the drenching steps of the invention described below, additional sensors may also be used to determine and verify that a massive leak, or a leak which can spread a cloud of toxic gas beyond the confines of the alkylating unit, has taken place. For instance, the temperature of the walls of an HF containment vessel or alkylating unit, and the pressure within the tank and feed lines are constantly monitored for this purpose.

As shown in FIG. 1, a computer 10 oversees the collection of the data registered by the devices, including the primary HF detectors 12, and the secondary temperature or pressure detectors 14. When the collected data indicate a massive leak, such as by a large pressure change and a temperature change, which are associated with such a leak, the computer 10 activates the acid knock-down system. Once a leak is detected and reported to computer 10, by detectors 12 and 14, pump 16 is activated causing injection of the proton acceptor, stored in tank 18, into the additive injector 20 inside the top of the HF storage where the HF leak is occurring. In all systems of this kind, it is preferred that the control sequence for emergency acid release control, i.e. injection of the additive into the acid, release of water drench and other chemical treatments, acid evacuation into secure locations (as described in Ser. No. 07/489,648), should be under the control of a separate emergency controller independent of the normal operating controller for the unit in order to ensure proper functioning of the emergency system if it is actuated.

As described in Ser. No. 07/229,669, the additive which is used to modify the characteristics of the HF alkylation acid is a multiple proton acceptor which, upon contact with the acid, picks up protons to form highly polar, multiply charged species which render the droplets of the acid susceptible to drenching with water so as to eliminate the aerosol effect of the released acid. The reaction which takes place between the proton acceptor, i.e., a material which functions as a base, in the Bronsted-Lowdry concept of acid/bases, and the alkylation acid when the proton acceptor (PA) is added to the alkylation acid, is shown in equation I below:

$$2HF + PA \rightarrow PAH^+ + [HF_2]^- \qquad \text{I}$$

For example, if the proton acceptor is acetic acid, i.e., a weak acid compared to the strong acid HF, the resultant composition with include ions of protonated acetic acid and hyrdrofluoride ions as shown in equation II below:

$$CH_3COOH + 2HF \rightarrow [CH_3COOH_2]^+ + [HF_2]^- \qquad II$$

The acceptance of the protons from the acid by the proton acceptor changes the characteristics of HF droplets rendering the droplets more susceptible to a water drench. This effect is more marked with the multiple proton acceptors which are the preferred species for this purpose since they form more highly polar species which render the water drench more effective for the knock-down of the acid cloud.

Examples of proton acceptors which are useful in either embodiment of the invention are compounds which have a structure chemically stable to HF and behave like bases in the strong acid environment of HF. A particularly effective compound is:

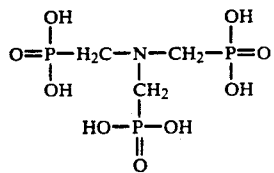

In this compound, the OH groups act as proton acceptors and the nitrogen is quaternized. The use of such a compound as above will create a positively charged entity, and [HF$_2$]$^-$ as the negatively charged counter ion. Other compounds capable of multiple protonation include 1-hydroxyethyldene-1,-1-diphosphonic acid, ethylenediaminetetramethylphosphonic acid, diethylenetriaminepentamethylphosphonic acid as well as acids without phosphorus such as polyacrylic acid, polymaleic acid and ethylenediaminetetraacetic acid. Such compounds are not soluble in the hydrocarbon phase but are soluble in acid. Most of these compounds are sold as water solutions containing 50% or more of the desired acid and may be used as is. The proton acceptors being injected into, or circulated with HF-alkylation acid, are used in concentrations in the range of 0.01-30% and preferably in the range of 0.15-10%.

By rendering HF more susceptible to a water drench from the very beginning stages of an HF massive leak, HF forming clouds can be treated with a water drench, which is activated by the computer upon detecting an HF leak. Using a simple water drench eliminates the need to use chemicals which are more costly than water.

As described in Ser. No. 07/229,669, the proton acceptor may be added to the HF-alkylation acid as part of the circulating acid charged to the alkylation unit. In this manner, the proton acceptor is a permanent component of the HF-alkylation acid catalyst, and HF escaping or accidentally released into the atmosphere is immediately rendered susceptible to a water drench eliminating the need to provide additional injection means for injecting a proton acceptor into the escaping HF. However, the choice of proton acceptors may be limited since some otherwise acceptable and effective acceptors may interfere with the alkylation reaction or, alternatively, may be unstasble over extended periods in contact with the alkylation acid. For these reason, the injection of the proton acceptor into the acid inventory only when necessary to deal with a massive leak is to be preferred.

Figure 2:
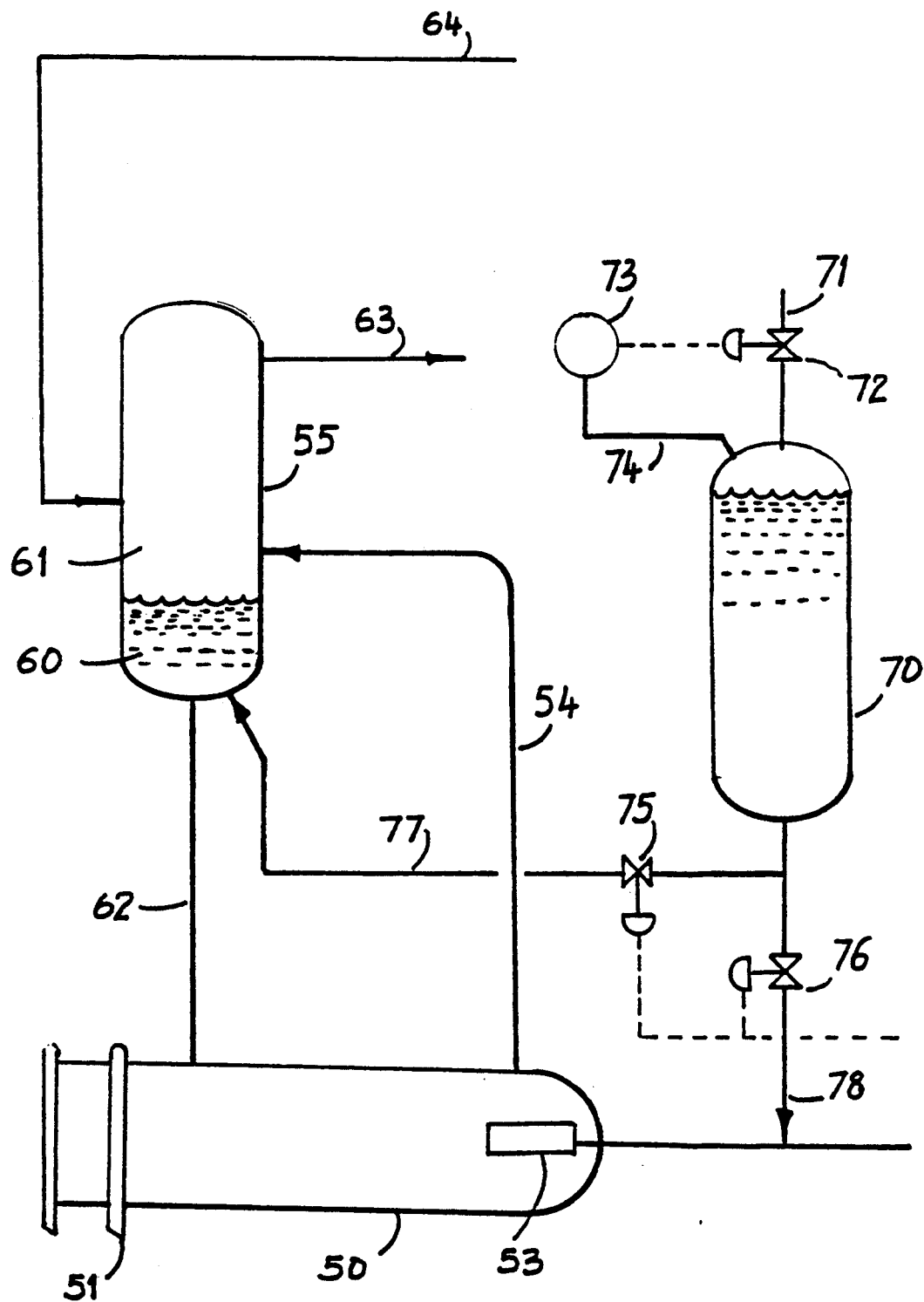

FIG. 2 shows, in simplified form, a portion of a gravity flow alkylation unit which is fitted with an acid deactivating system. The portion of the unit shown includes the acid cooler 50 which is provided with cooling coils 51. Conduit 52 enters acid cooler 50 to admit hydrocarbon feed through sparger 53. Riser 54 extends upwardly from cooler 50 and at its upper end enters acid settler 55. During operation of the unit, the alkylation reaction takes place in riser 54, with the alkylation reaction between the olefin and iso-butane feeds being catalysed by the HF alkylation acid. Following the reaction in the riser, a phase separation takes place in acid setter 55, with the formation of a lower, denser phase acid 60 and a supernatant hydrocarbon phase 61. The acid phase returns to acid cooler 50 by way of return leg 62. The hydrocarbon phase, including alkylate product, unreacted olefins and iso-butane is removed through withdrawal line 63 and passed to the fractionation section of the unit (not shown). Acid from the fractionation section is returned to acid settler 55 by way of recycle line 64.

A supply of the proton acceptor is maintained in liquid form e.g. a solution, in additive drum 70, under a positive pressure which is greater than that prevailing in the reactor portion of the unit (i.e. the acid cooler, riser, settler and return leg). Pressure is provided by nitrogen or gas supplied from the depropaniser by was of pressurising line 71. The pressure previling in the additive drum is controlled by means of gas inlet valve 72 under the control of pressure controller 73 linked to the drum by pressure line 74. In a typical unit, the pressure prevailing in the reactor section of the unit will be about 85 psig in the acid settler with higher pressure in the acid cooler as a result of the liquid head above the cooler. In such a case, the pressure in the additive drum is suitably about 150 psig so as to enable the additive to be transferred under pressure into the reactor portion of the unit when required.

When the system monitoring devices indicate a release of acid from the unit under circumstances which require the additive to be mixed with the acid, the additive transfer valves 75 and 76 are opened under the control of the monitoring and control system to permit the additive to be injected by means of conduits 77 and 78, respectively, into the acid settler 55 and hydrocarbon feed line 52. Two injection points are selected in order to mix the additive with most or all of acid in the unit in the shortest possible time. More injection points may also be used, depending upon the configuration of the unit and the sizes of the individual process vessels and the lengths of the pipe runs in the unit. The number and location of the injection points by be selected by a dynamic simulation modelling technique which is programmed to ensure the most rapid and complete mixing of the additive with the acid in the unit.

Figure 3:
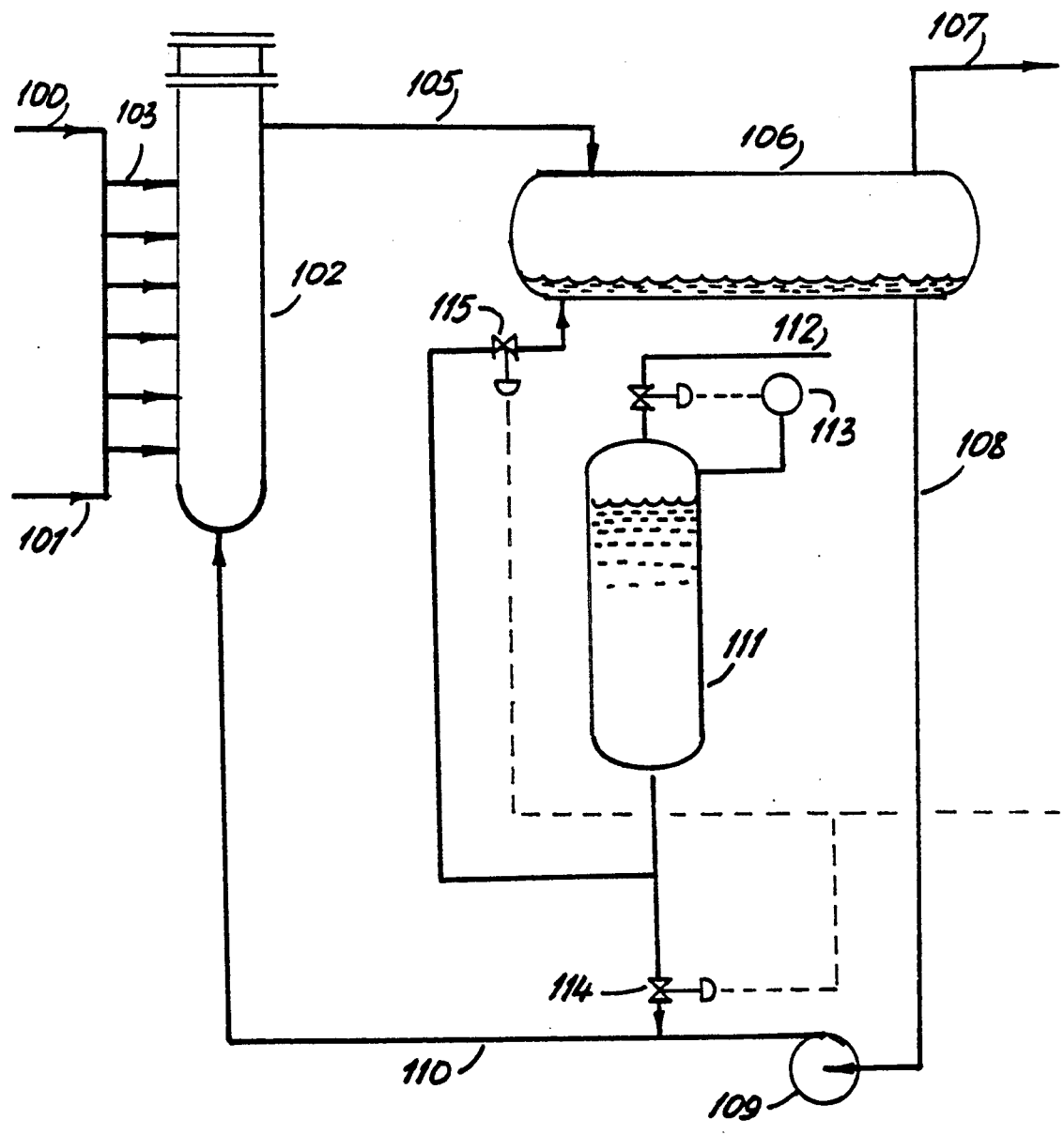

FIG. 3 shows a similar additive injection system which is incorporated into a pump-around type alkylation unit. Units of this type typically have a lower acid inventory than the gravity flow units and therefore will require a lower volume of the additive for modification of the acid properties; nevertheless, the use of the additive injection system represents a valuable addition to the intrinsic safety of the unit. The unit shown in the figure is a partial schematic of the unit, with the reactor and acid settler equipment shown and the fractionation and product recovery sections omitted as these may be conventional in character. The olefin feed is introduced through inlet line 100 and the iso-paraffin through line 101. The hydrocarbon is fed to vertical reactor 102 at a number of vertically spaced positions along the axis of the reactor through spargers supplied through individual inlets 103 (only one designated), to ensure the production of a high quality alkylate product. The effluent from the reactor is passed through line 105 to acid settler 106 where a phase separation of the acid and hydrocarbon phases takes place, as described above. The hydrocarbon phase is withdrawn through product line 107 and passes to the fractionation and product recovery section of the unit. The denser acid phase is withdrawn through lines 108 and recirculated by means of pump 109 to the reactor by way of return line 110.

The additive is maintained in the form of a liquid e.g. a solution, in additive drum 111 which is maintained under pressure through line 112 under the control of pressure controller 113, connected to drum 111. Pressurising gas may be supplied from the depropaniser tower or from an inert gas source. Additive transfer valves 114 and 115 are controlled from the system controller and upon activation by the controller permit the additive solution to be released into the circulation loop at the acid settler 106 and the acid return line 110. By positioning the transfer valves close to the acid loop, the mixing of the additive with the acid and modification of the acid properties will be faster, so as to promote rapid modification of the acid properties. Again, the optimal points for the additive injection may be determined by dynamic simulation modelling using the parameters of the unit in question.

The additive injection system may be incorporated into a low acid inventory unit of the type disclosed in application Ser. No. 07/489,648 in a similar manner to that described above with reference to the pump-around unit, thus, the additive container may suitable be connected to the acid settler and to the acid recirculation line to the reactor, just upstream of the reactor, with transfer valves appropriately positioned to release the additive into the acid stream with the minimum delay.

The acid modification can be practised in combination with other methods for removing or dealing with HF. As shown schematically in FIG. 1, a particularly effective method relates to a tripartite drench system which includes an initial water drench. For instance, after the HF cloud has been modified with the proton acceptor, the computer activates pump 24, and opens valve 26. Water from an on-site storage tank 28, or other supply is pumped at about 8,000 gals/min to spray nozzles 30 located above and surrounding the alkylation acid structure 22. This first water drench could conceivably contain the entire forming HF cloud but in the unlikely event of a leak capable of forming a toxic cloud which cannot be contained within the confines of the alkylation unit, a water drench may not absorb all of the HF. Therefore, even after the first initial detection of the presence of HF the primary HF detectors will continually monitor for the presence of HF. The data will be constantly compiled by computer 10 which will continue the water drench for a short period until the computer determines that the continued water application alone is ineffective in removing HF. The water drench is then shut down or used in combination with a second drench.

In order to contain a greater portion of the cloud an aqueous drench containing an alkaline earth chloride is release concurrently with, or after the initial water drench. Suitable aqueous solutions include solutions which contain at least one compound of the formula of $CaCl_2$, and $CaBr_2$. Preferred aqueous solutions contain $CaCl_2$.

Calcium chloride or calcium bromide will react with HF to form water-insoluble $CaF_2$ salts which are harmless. Hydrochloric acid is also produced in the reaction between $CaCl_2$ and HF, and the HCl can be neutralized by application of lime after containment of the HF cloud. The aqueous calcium chloride or bromide solutions contain between about 1.0 to 30 parts of the halogen compound per 100 parts of water, preferably 5 to 10 parts of the halogen compound per 100 parts of water. This second drench is delivered to the area of the leak, under control of computer 10 from a second on-site storage tank 32 by pump 24 at a rate of about 8,000 gal/min after the computer opens valve 34. If large quantities of HF are still detected by the computer as it monitors the HF detectors, a third drench is activated by the computer. This drench can be used alone or in combination with the first two drenches.

The third aqueous drench is composed of (i) at least one surfactant capable of generating a foam, (ii) a foam stabilizer and (iii) a phase transfer agent.

Surfactants capable of generating a foam include anoinic surfactants, cationic surfactants and non-ionic surfactants. A non-limiting compilation of specific surfactants capable of generating foam are disclosed in Kirk-Othmer: Encyclopedia of Chemical Technology, 3rd Edition, Volume 22, pages 332-386 to which reference is made for a description of such surfactants.

The second component of the third drench is chosen for its ability to sustain the foam. A suitable, non-limiting, foam-sustaining component is a trialkylamine-N-oxide of the formula:

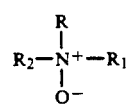

where R, $R_1$ and $R_2$ are the same or different and represent linear or branched $C_1-C_{18}$ alkyl groups. The trialkylamine-N-oxide can be used in concentrations of between 0.01–50% and preferably between 0.05–15%.

The phase transfer agent of the third drench is a material which has the ability to traverse the boundaries of the hydrocarbon-aqueous interface and allow the trapped acid in the organic phase to contact the aqueous foam, allowing for containment of the remaining HF. Suitable phase transfer agents include onium salts, such as ammonium, phosphonium and arsonium species, and the polyethers, including polyethylene glycols, including their derivatives such as crown ethers, cryptates etc.

A non-limiting list of useful phase transfer agents include such onium salts as benzyltriethylammonium chloride, benzyltrimethylammonium chloride, benzyltrimethylammonium hydroxide, benzyltrimethylammonium methoxide, benzyltriphenylphosphonium chloride, didodecyldimethylammonium chloride, hexadecylbenzyldimethylammonium chloride, hexadecyldimethylethylammonium bromide, 1-hexadecylpyridinium bromide, hexadecyltributylphosphonium bromide, octadecylbenzyldimethylammonium chloride, tetramethylammonium chloride. A second non-limiting list of possible phase transfer agents include crown ethers such as Benzo-15-Crown-5 ($C_{14}H_{20}O_5$), 18-Crown-6 (1,4,7,10,13,16 hexaoxacyclooctadecane), Dibenzo-18-Crown-6 ($C_{20}H_{24}O_6$), Dicyclocohexano-18-Crown-6 ($C_{20}H_{36}O_6$), cryptates, such as 1,10-Diaza-18-Crown-6 ($C_{12}H_{26}N_2O_4$), 4,7,13,16,21-Pentaoxa-1,10-diazabicyclo [8.8.8,] tricosane ($C_{16}H_{32}N_2O_5$) and 5,6-Benzo-4,7,13,16,21,24-hexaoxa-1,10-diazabicyclo-[8.8.8] hexacosane ($C_{22}H_{36}N_2O_6$).

The third drench serves a plurality of purposes. The foam will suppress the HF cloud; the foam, through its phase transfer component, will allow the HF trapped within the hydrocarbon component of the alkylation acid to contact the aqueous phase and; thirdly, the foam stabilizer of the drench helps neutralize remaining HF. The foam will also absorb toxic vapors.

The third drench is pumped by pump 24 from storage tank 36, located within the vicinity of the alkylation unit, after the computer opens valve 38, to the HF leak at a rate of about 8,000 gals/min. Once the HF cloud has been contained, i.e., knocked to the ground, the HCl is neutralized with lime and the solid $CaF_2$ formed is removed by mechanical means.

The drenches are released in the most economical sequence possible, i.e., first the water drench is released, then the alkaline earth chloride drench and then the application of the foam drench. However, the drenching steps of the invention can also be practiced by concurrently delivering all three drenches through separate pipelines to a spill at individual rates of about 8,000 gal/min, or at combined rates of about 8,000 gal/min.

In another embodiment, tank 32 contains a concentrated solution of $CaCl_2$, for instance the concentration may be a 50% concentrated solution of $CaCl_2$, and tank 36 contains a concentrated composition (e.g., 50%) composed of at least one surfactant capable of generating a foam, a foam stabilizer and a phase transfer agent.

Separate vacuum or aspirating pipes (not shown) are connected to tanks 32 and 36 and to a water supply line which is connected at one end to a water supply and at a second end to nozzles 30. The flow rate of the water passing through the supply line is regulated and the concentrated solutions are sucked into the supply line and diluted to desired concentration before passing from the water supply line to nozzles 30. Using a concentrated solution, of course, allows for greater drench storage capacity.

We claim:

1. In an HF alkylation unit which comprises (i) a reaction section including an alkylation reactor in which an iso-paraffin is reacted with an olefin in the presence of HF as an alkylation catalyst to form an alkylate product, an acid settler in which the HF is separated from hydrocarbons including unreacted iso-paraffin and alkylate product, and (ii) a product recovery and fractionation section in which alkylate product from the reaction section is separated and recovered, the improvement comprising
   means for detecting a hydrofluoric acid leak forming a vaporous cloud from the alkylation unit;
   a container having a proton acceptor to be mixed with the HF acid in the unit to modify the properties of the acid to render droplets of the acid more susceptible to water drench,
   means responsive to the means for detecting the hydrofluoric acid leak, for selectively releasing the proton acceptor into the reaction section of the unit in the event of a detected release of acid from the unit, to mix the proton acceptor with the HF acid in the unit to modify the properties of the acid and render droplets of the acid more susceptible to water drench.

2. An HF alkylation unit according to claim 1 in which the container having the proton acceptor is connected to the acid settler.

3. An HF alkylation unit according to claim 1 in which the container having the proton acceptor is connected to a conduit in the reaction section of the unit.

4. An HF alkylation unit according to claim 1 in which the alkylation unit is a gravity flow unit including an acid cooler connected to the acid settler by means of a riser reactor and an acid return leg for returning acid from the settler to the cooler, and in which the container having the proton acceptor is connected to the acid cooler.

5. An HF alkylation unit according to claim 1 in which the alkylation unit is a pumped circulation unit and in which the container having the proton acceptor is connected to an inlet of the reactor.

6. An HF alkylation unit according to claim 1 in which the alkylation unit is a pumped circulation unit and in which the container having the proton acceptor is connected to the acid settler.

7. An HF alkylation unit according to claim 1 wherein the improvement further includes means for maintaining the pressure on the proton acceptor in the container at a value above that of the reaction section of the alkylation unit.

* * * * *